United States Patent
Wang

(10) Patent No.: US 12,467,553 B2
(45) Date of Patent: Nov. 11, 2025

(54) MIXING VALVE CAPABLE OF ADJUSTING MAXIMUM DISCHARGE TEMPERATURE

(71) Applicant: ING TZON CO., LTD., Changhua County (TW)

(72) Inventor: Tsang-Min Wang, Changhua County (TW)

(73) Assignee: ING TZON CO., LTD., Changhua (TW)

( * ) Notice: Subject to any disclaimer, the term of this patent is extended or adjusted under 35 U.S.C. 154(b) by 34 days.

(21) Appl. No.: 18/529,453

(22) Filed: Dec. 5, 2023

(65) Prior Publication Data
US 2025/0137551 A1    May 1, 2025

(30) Foreign Application Priority Data

Oct. 27, 2023  (TW) .................................. 112141431

(51) Int. Cl.
| | |
|---|---|
| F16K 31/52 | (2006.01) |
| E03C 1/04 | (2006.01) |
| F16K 11/00 | (2006.01) |
| F16K 11/074 | (2006.01) |

(52) U.S. Cl.
CPC ............ F16K 31/521 (2013.01); E03C 1/041 (2013.01); F16K 11/074 (2013.01); F16K 19/006 (2013.01)

(58) Field of Classification Search
CPC .... F16K 31/521; F16K 11/074; F16K 19/006; E03C 1/041
See application file for complete search history.

(56) References Cited

U.S. PATENT DOCUMENTS

| | | | |
|---|---|---|---|
| 6,626,203 B1 * | 9/2003 | Schneider | F16K 27/045 251/288 |
| 7,007,717 B2 * | 3/2006 | Lin | F16K 31/535 251/285 |
| 8,118,057 B2 * | 2/2012 | Deutsch | F16K 11/0743 251/285 |

FOREIGN PATENT DOCUMENTS

TW         M266395 U      6/2005

\* cited by examiner

*Primary Examiner* — Michael R Reid
(74) *Attorney, Agent, or Firm* — MUNCY, GEISSLER, OLDS & LOWE, P.C.

(57) ABSTRACT

A mixing valve includes a cap, a column and a setting member. A valve body which is connected with the column is turned by the column for adjustment to discharge of hot and cold water. A second positioning portion of the setting member is selectively engaged with a first positioning portion of the cap to limit axial movement of the setting member. The second clutch portion is selectively connected with the first clutch portion as a result of where the setting member is. The setting member is capable of axially rotating to move the block when the second clutch portion is separated from the first clutch portion. The block is immovable when the second clutch portion is connected with the first clutch portion.

6 Claims, 6 Drawing Sheets

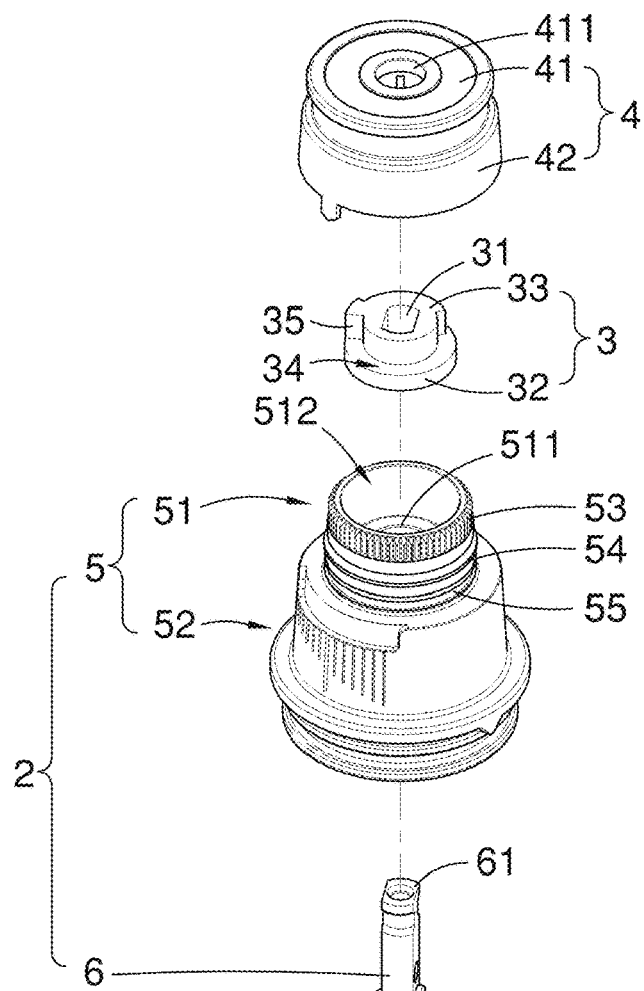
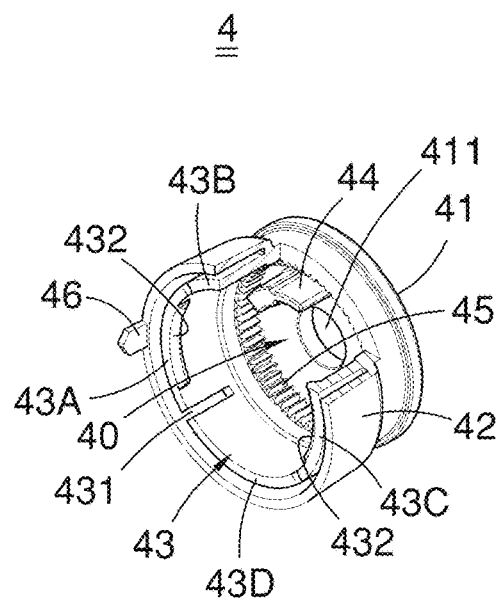
FIG. 2
FIG. 3

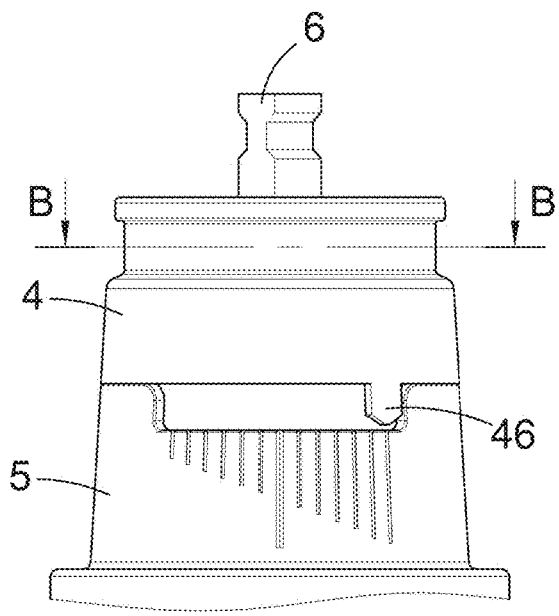
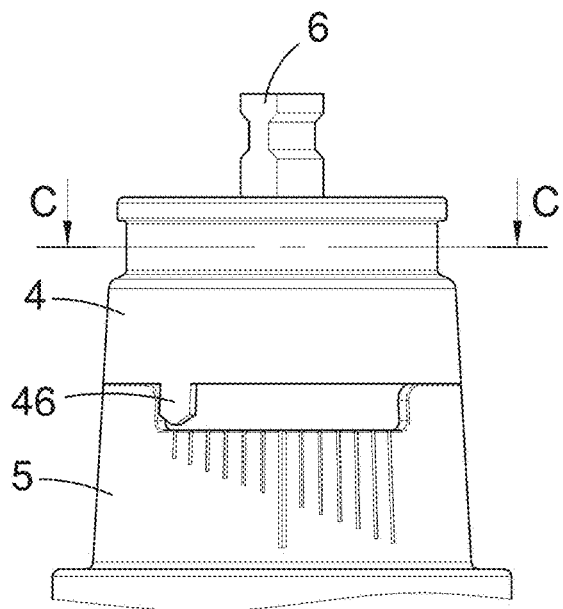
FIG. 7A                FIG. 8A
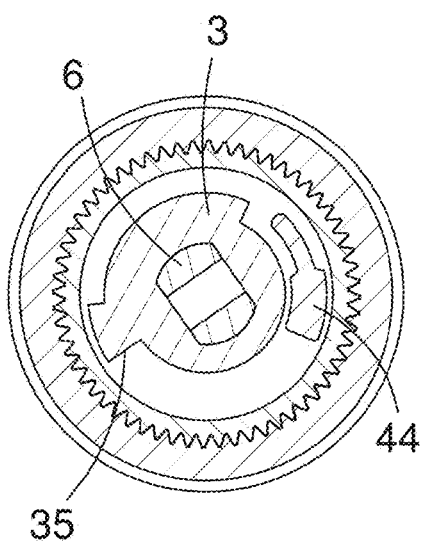
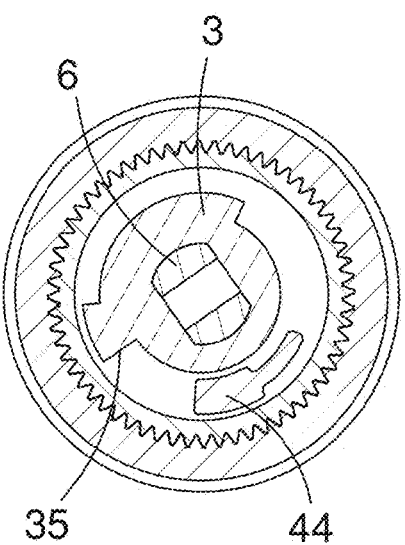
FIG. 7B                FIG. 8B

MIXING VALVE CAPABLE OF ADJUSTING MAXIMUM DISCHARGE TEMPERATURE

BACKGROUND OF INVENTION

1. Field of Invention

The present invention relates to mixing valves and, more particularly, to temperature rotational limit stops for mixing valves.

2. RELATED PRIOR ART

Warm water discharged from a faucet is combined by hot water and cold water. To prevent scald and burn, there is now a faucet that can adjust maximum discharge temperature as disclosed in Taiwan Patent M266395.

SUMMARY OF INVENTION

The present invention provides a mixing valve including a valve body with a hot water outlet and a cold water outlet, a cap, a column, a stopper with a stop surface and a setting member. A top side of the cap is provided with a first clutch portion and a first positioning portion while a bottom side of the cap is connected with the valve body. The column is concentrically received within the cap and capable of axially rotating. A valve plate with a hot water opening and a cold water opening is coupled to the column. The valve plate faces towards the hot water outlet and the cold water outlet and is turned together with the column. The stopper is secured to the column. The setting member is capable of moving in an axial direction of the cap. The setting member includes a second clutch portion, a second positioning portion and a block. The second positioning portion is configured to selectively engage the first positioning portion to limit axial movement of the setting member relative to the cap. The second clutch portion is selectively connected with the first clutch portion as a result of where the setting member is. The setting member is capable of axially rotating to move the block when the second clutch portion is separated from the first clutch portion. The block is immovable when the second clutch portion is connected with the first clutch portion.

Preferably, the cap includes an upper portion and a lower portion with a greater diameter than that of the upper portion. The upper portion has a chamber to receive the stopper which does not protrude beyond the chamber.

Preferably, the setting member includes a top portion and an outer skirt portion extending downward from a circumference of the top portion. An upper space is defined by the top portion and the outer skirt portion to receive the second clutch portion, the second positioning portion, the block and the upper portion of the cap.

Preferably, an inner skirt portion is disposed in the upper space, each of the second clutch portion and the second positioning portion is located inside the inner skirt portion.

Preferably, the first clutch portion is formed as a plurality of radially outwardly extending splines arranged around the upper portion of the cap. The second clutch portion is formed as a plurality of radially inwardly extending splines arranged around the inner skirt portion.

Preferably, the inner skirt portion includes a plurality of parts spaced apart. Some of the parts are provided with the second positioning portion.

Preferably, the setting member includes an indicator to show orientation of the setting member relative to the cap.

Preferably, the first positioning portion includes an upper flange and a lower flange. The second positioning portion is formed as an inward flange. The inward flange is abutted against the lower flange when the second clutch portion is connected with the first clutch portion. The inward flange is abutted against the upper flange when the second clutch portion is separated from the first clutch portion.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein:

FIG. 2 is a perspective exploded view of the present invention;

FIG. 3 is a perspective view of the setting member of the present invention;

FIG. 7A is a plan view of the present invention showing the discharge temperature is set to maximum value;

FIG. 7B illustrates cross-sectional view in B-B direction marked in FIG. 7A;

FIG. 8A is a plan view of the present invention showing the discharge temperature is set to minimum value;

FIG. 8B illustrates cross-sectional view in C-C direction marked in FIG. 8A.

DETAILED DESCRIPTION OF PREFERRED EMBODIMENT

Figure 1:
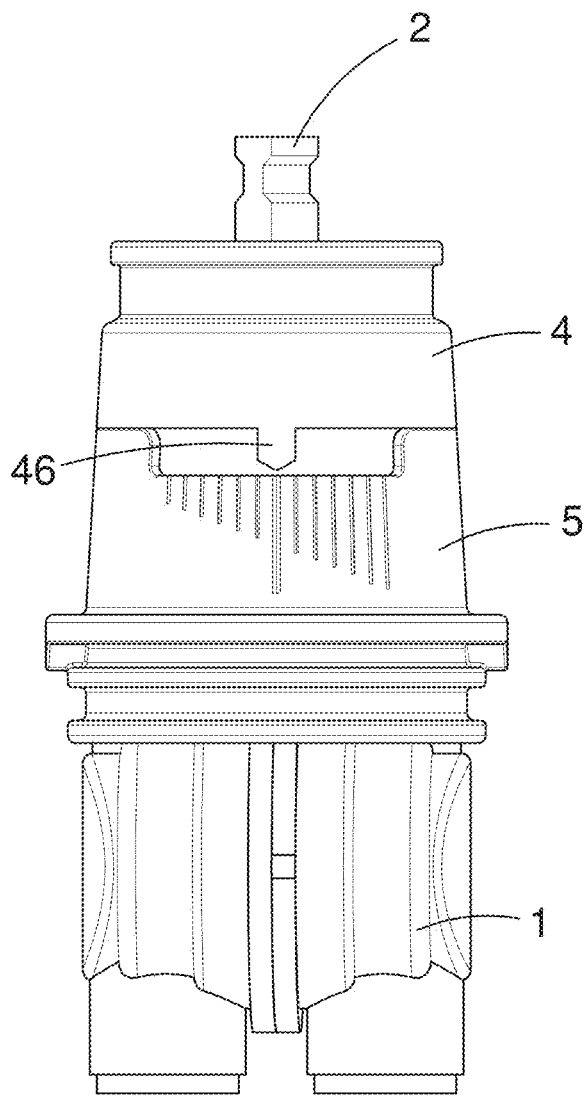
FIG. 1 is a plan view of the present invention.

FIGS. 1 and 2 show a preferred embodiment of a mixing valve of the present invention including a valve body 1, a temperature adjusting module 2, a stopper 3 and a setting member 4. One side of the valve body 1 is provided with a cold water inlet 11 and a hot water inlet 12 while another side of the valve body 1 is provided with a cold water outlet 13 and a hot water outlet 14.

The temperature adjusting module 2 includes a cap 5 and a column 6. The cap 5 is hollow, and its bottom end is coupled to the valve body 1. The column 6 is received within the cap 5. A top end 61 of the column 6 is formed in a non-circular shape and is coupled with a handle (not shown) to drive the column 6 to rotate axially in the cap 5. A valve plate 62 with a cold water opening 621 and a hot water opening 622 is coupled to bottom end of the column 6 and face toward the valve body 1. The valve plate 62 rotates together with the column 6 so that the cold water opening 621 and the hot water opening 622 move to align with the cold water outlet 13 and the hot water outlet 14. Flow rate of hot water is determined by the overlap ratio of the hot water opening 622 and the hot water outlet 14 so that discharge temperature is adjusted.

In this embodiment, the cap 5 includes an upper portion 51 and a lower portion 52 with a greater diameter than that of the upper portion 51. The outer circumference of the upper portion 51 is provided with a plurality of radially outwardly extending splines 53, along with an upper flange 54 and a lower flange 55 under the splines 53. An annular plate 511 is disposed inside the upper portion 51 to define a chamber 512 for receiving the stopper 3 completely, that is, the stopper 3 does not stick out of the chamber 512. The stopper 3 has a through hole 31 with the same shape as the top end 61 of the column 6 for the column 6 inserting into the through hole 31 so that the stopper 3 can be driven by the column 6 to rotate together.

The stopper 3 includes a bottom plate 32 and a stem portion 33 with a less diameter than that of the bottom plate 32. An arc retreat space 34 is formed around the stem portion 33. A stop surface 35 protrudes from the stem portion 33 into the retreat space 34.

The setting member 4 is disposed above the cap 5. As shown in FIG. 3, the setting member 4 includes a top portion 41 and an outer skirt portion 42 extending downward from a circumference of the top portion 41, thus defining an upper space 40. A hole 411 is provided on the top portion 41 for the column 6 to penetrate through. Within the upper space 40, an inner skirt portion 43 spaced apart from the outer skirt portion 42 is integrally connected to the top portion 41, and a block 44 is disposed inside the inner skirt portion 43. A plurality of radially inwardly extending splines 45 is arranged around the inner skirt portion 43. Four deep depressions 431 divide the inner skirt portion 43 into four equal parts 43A, 43B, 43C, 43D whose terminal ends are separated from each other. Terminal ends of some or all parts are provided with an inward flange; in this embodiment, each of the parts 43A, 43C, which are opposite to each other, is provided with the inward flange 432.

Figure 4:
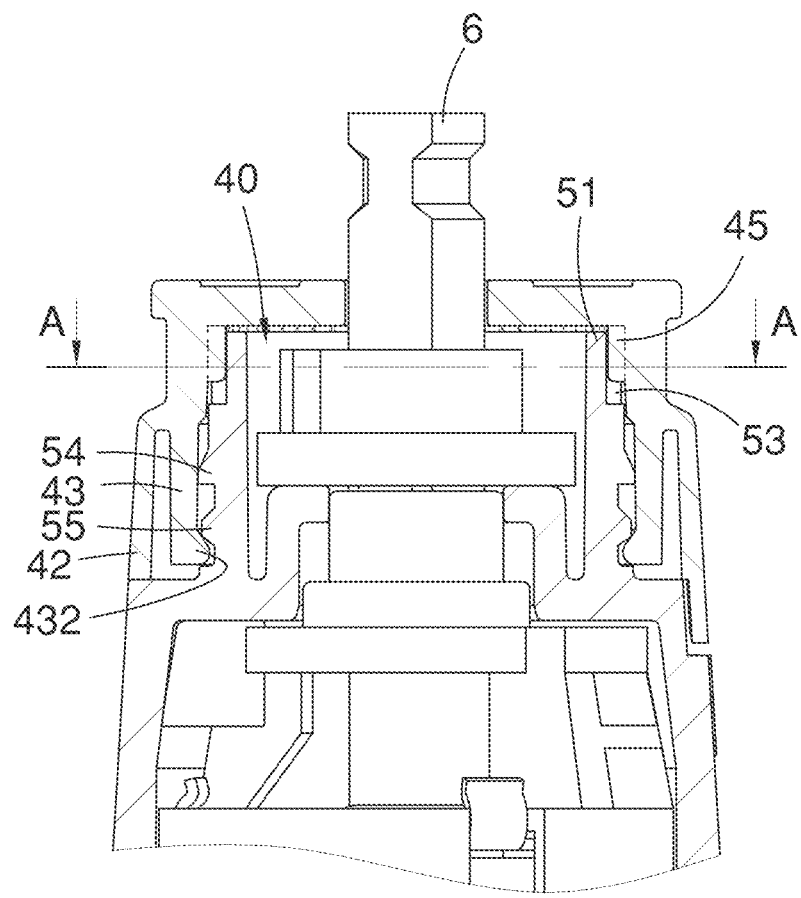
FIG. 4 is a cross-sectional view of the present invention when in use.
Figure 5A:
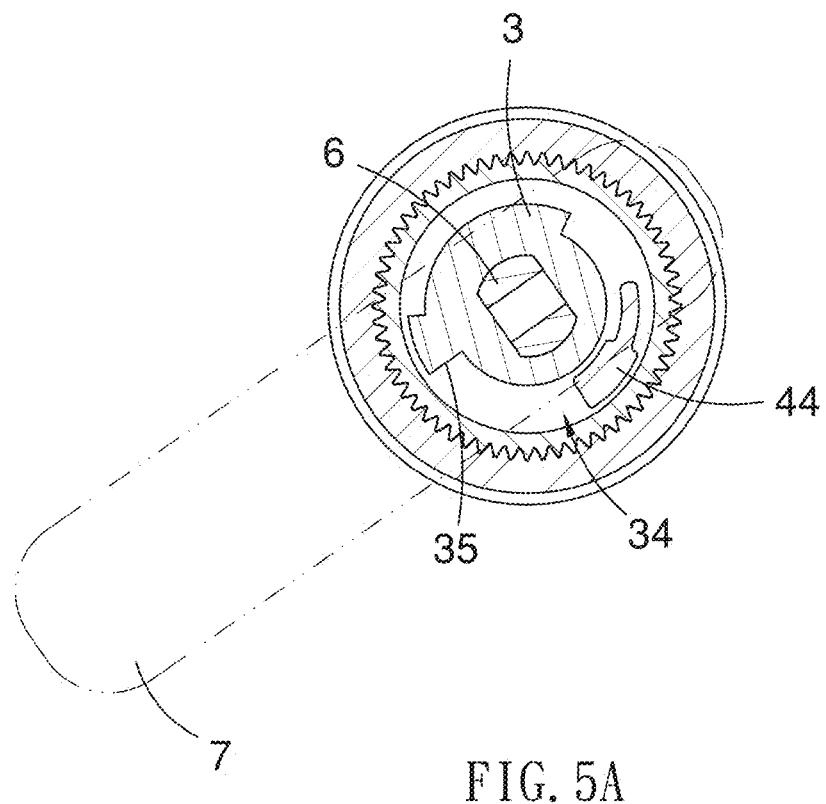
FIG. 5A illustrates cross-sectional view in A-A direction marked in FIG. 4.
Figure 5B:
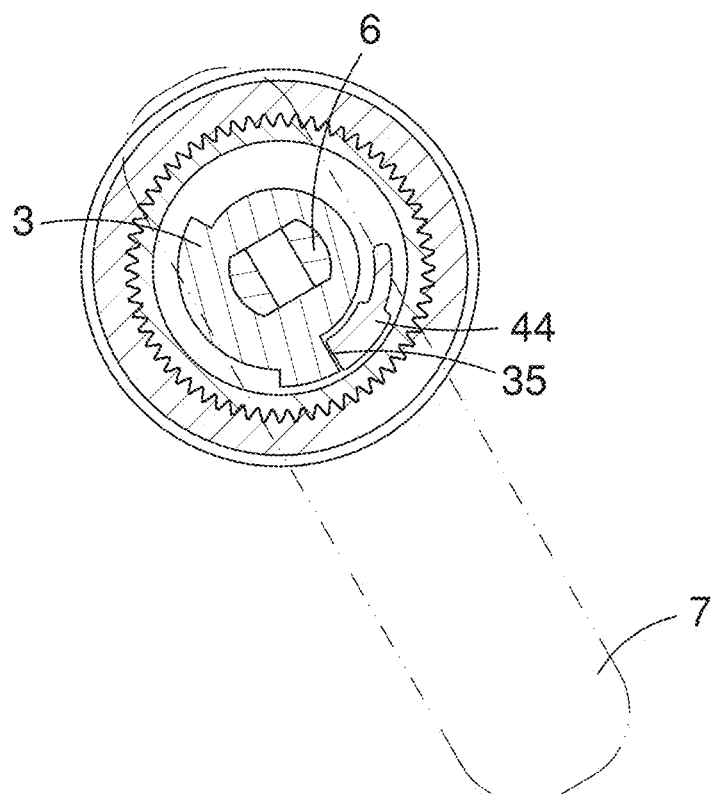
FIG. 5B is a cross-sectional view of the present invention after the column is turned.
Figure 6:
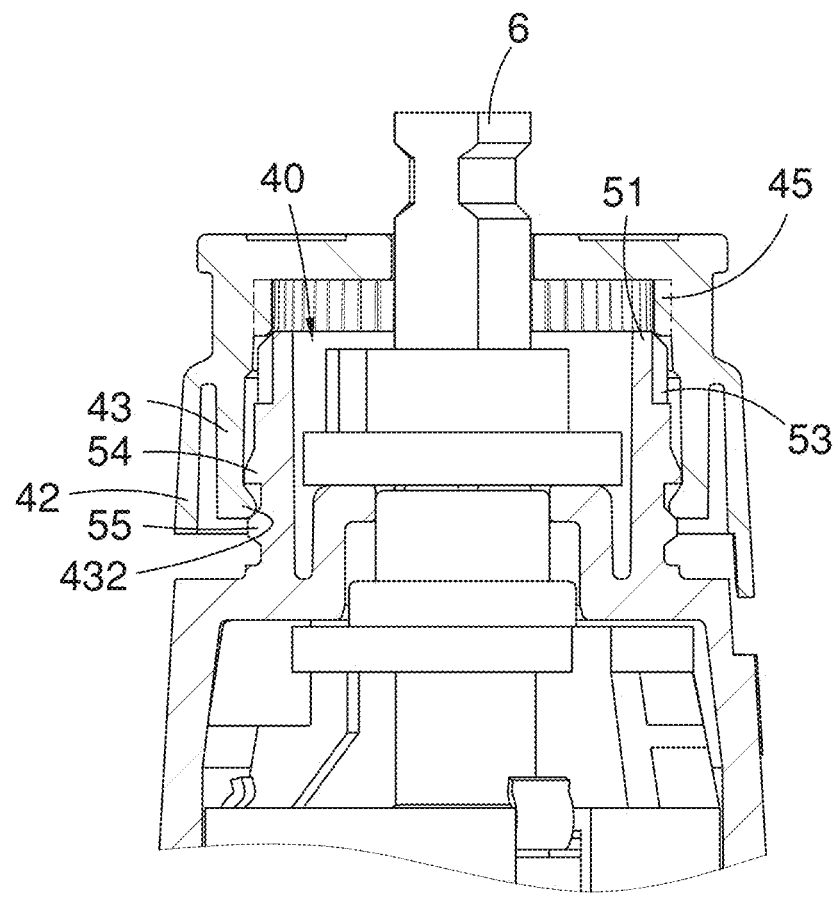
FIG. 6 is a cross-sectional view of the present invention when in setting.

The upper portion 51 of the cap 5 is received in the upper space 40 of the setting member 4, and the setting member 4 is movable in a certain distance relative to the cap 5. Comparing FIG. 4 to 6, the inward flange 432 of the setting member 4 is engaged with the lower flange 55 of the cap 5 if the setting member 4 is pressed to a lower position as shown in FIG. 4, and thus the setting member 4 is positioned at this location. The inward flange 432 can move pass the lower flange 55 to reach a higher position as shown in FIG. 6 based on flexibility of the parts 43A, 43B, 43C, 43D and is then engaged with the upper flange 54 after raising the setting member 4, and thus the setting member 4 is positioned at this location.

When the setting member 4 is located in the lower position as shown in FIG. 4, the splines 45 of the setting member 4 is engaged with the splines 53 of the upper portion 51 so that the setting member 4 is stopped from rotating relative to the cap 5. In this case, referring to FIG. 5, the block 44 is stuck into the retreat space 34 and is distanced from the stop surface 35 by a distance which corresponds to how far the column 6, along with the stopper 3, can be driven by the handle 7 to rotate till the stop surface 35 abuts against the block 44. The distance between the block 44 and the stop surface 35 represents the temperature range of the discharge. Actually, in the course of the handle 7 rotating to the position where the stop surface 35 abuts against the block 44, area of the gate connecting the hot water opening 622 and the hot water outlet 14 increases for more hot water to pass through, and thus water temperature is increased. Accordingly, it is clear to know that the greater the distance between the block 44 and the stop surface 35 is, the greater maximum value of the water temperature will be.

In view of the above, the maximum value of the water temperature is able to be adjusted by changing the distance between the block 44 and the stop surface 35. Pulling up the setting member 4 as shown in FIG. 6, the splines 45 are separated from the splines 53 of the upper portion 51 of the cap 5, and thus the setting member 4 can rotate relative to the cap 5. The setting member 4, accordingly, can be turned to a desired position as shown in FIG. 7A or 8A to move the block 44 and then returns to be fixed after being pressed down for splines 45 to be engaged with splines 53.

When the setting member 4 is fixed in a desired position as shown in FIG. 7A, the block 44 is correspondingly located in a position which shows in FIG. 7B. There is a greater distance between the block 44 and the stop surface 35 (comparing with FIG. 8B) so that a higher maximum discharge temperature is obtained. Otherwise, when the setting member 4 is fixed in another position as shown in FIG. 8A, the block 44 is correspondingly located in a position as shown in FIG. 8B. There is a less distance between the block 44 and the stop surface 35 (comparing with FIG. 7B) so that a lower maximum discharge temperature is obtained.

Furthermore, the setting member 4 includes an indicator 46 to show orientation of the setting member 4 relative to the cap 5. The indicator 46 also indicates where the block 44 is and the maximum discharge temperature with its position.

What is claimed is:

1. A mixing valve comprising:
   a valve body with a hot water outlet and a cold water outlet;
   a cap provided with a first clutch portion and a first positioning portion at a top side thereof and connected with the valve body at a bottom side thereof;
   a column concentrically received within the cap and capable of axially rotating, the column being coupled with a valve plate opposite to the valve body, a hot water opening and a cold water opening being provided on the valve plate to face towards the hot water outlet and the cold water outlet, the valve plate being turned together with the column;
   a stopper with a stop surface, the stopper being secured to the column;
   a setting member capable of moving in an axial direction of the cap, the setting member having a second clutch portion, a second positioning portion and a block, the second positioning portion being configured to selectively engage the first positioning portion to limit axial movement of the setting member relative to the cap, the second clutch portion being selectively connected with the first clutch portion as a result of where the setting member is, the setting member being capable of axially rotating to move the block when the second clutch portion is separated from the first clutch portion, the block being immovable when the second clutch portion is connected with the first clutch portion
   wherein the cap includes an upper portion and a lower portion with a greater diameter than that of the upper portion, the upper portion having a chamber to receive the stopper;
   wherein the setting member includes a top portion and an outer skirt portion extending downward from a circumference of the top portion, an upper space being defined by the top portion and the outer skirt portion to receive the second clutch portion, the second positioning portion, the block and the upper portion of the cap.

2. The mixing valve according to claim 1, wherein an inner skirt portion is disposed in the upper space, each of the second clutch portion and the second positioning portion being located inside the inner skirt portion.

3. The mixing valve according to claim 2, wherein the first clutch portion is formed as a plurality of radially outwardly extending splines arranged around the upper portion of the cap while the second clutch portion is formed as a plurality of radially inwardly extending splines arranged around the inner skirt portion.

4. The mixing valve according to claim 2, wherein the inner skirt portion includes a plurality of parts spaced apart, some of the parts being provided with the second positioning portion.

5. The mixing valve according to claim 1, wherein the setting member includes an indicator to show orientation of the setting member relative to the cap.

6. The mixing valve according to claim 1, wherein the first positioning portion includes an upper flange and a lower flange while the second positioning portion is formed as an inward flange, the inward flange being abutted against the lower flange when the second clutch portion is connected with the first clutch portion, the inward flange being abutted against the upper flange when the second clutch portion is separated from the first clutch portion.

* * * * *